United States Patent [19]
Yohn et al.

[11] 3,777,110
[45] Dec. 4, 1973

[54] WELDING GUN

[75] Inventors: Melvin G. Yohn, Canton; Joseph P. Simon, Massillon, both of Ohio

[73] Assignee: Ecodyne Corporation, Chicago, Ill.

[22] Filed: Nov. 29, 1972

[21] Appl. No.: 310,317

[52] U.S. Cl. .......................... 219/125 R, 219/60 A
[51] Int. Cl. ............................................. B23k 9/12
[58] Field of Search .................... 219/125 R, 60 A, 219/61, 130, 137

[56] References Cited
UNITED STATES PATENTS

| | | | |
|---|---|---|---|
| 1,949,251 | 2/1934 | Gilbert | 219/125 R |
| 3,114,830 | 12/1963 | Wotitzky | 219/125 R |

*Primary Examiner*—R. F. Staubly
*Assistant Examiner*—L. A. Schutzman
*Attorney*—Charles M. Kaplan et al.

[57] ABSTRACT

Welding apparatus for welding heat exchange tubes to tube sheets or headers for use in heat exchange equipment. The welding apparatus includes a welding electrode which is selectively retracted and extracted from within a hollow positioning member. The positioning tube with the welding electrode in its retracted position is dimensioned to permit insertion into the header through one of the holes in the plug sheet. The positioning tube includes a bushing which is threadedly received in the plug sheet hole and a fitting which is received by the heat exchange tube being welded so as to locate and center the positioning tube. The welding electrode may then be extracted through a groove in the positioning tube and caused to rotate through a gear mechanism to describe the required circular weld. Welding material and inert gas is supplied through the center of the welding electrode.

17 Claims, 6 Drawing Figures

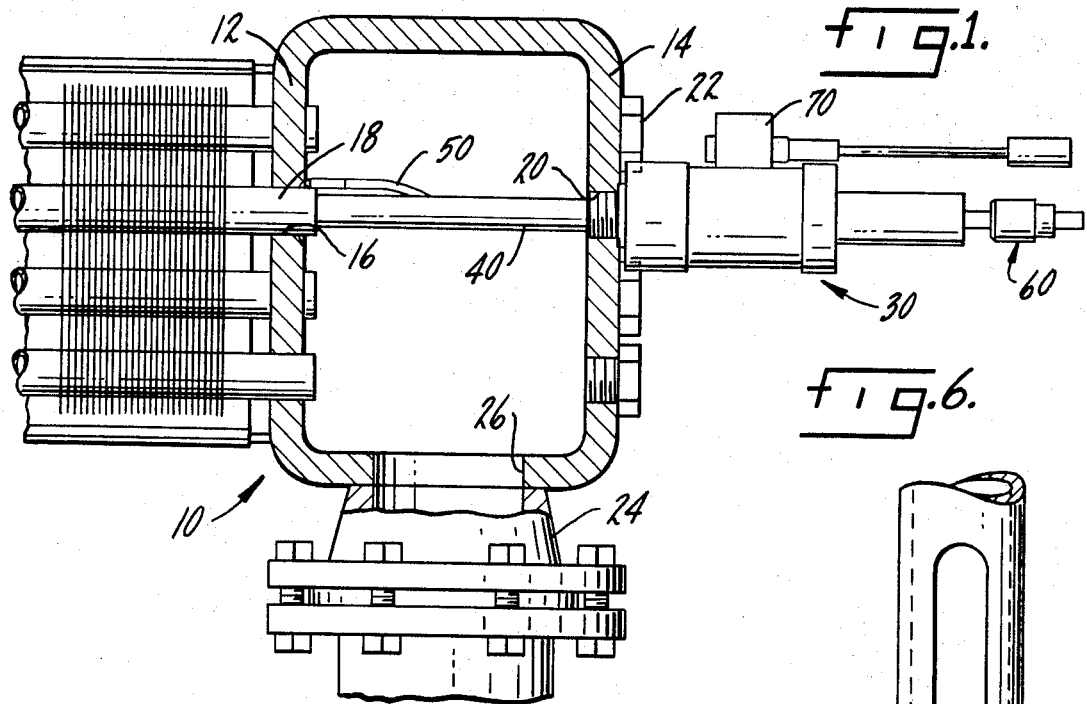
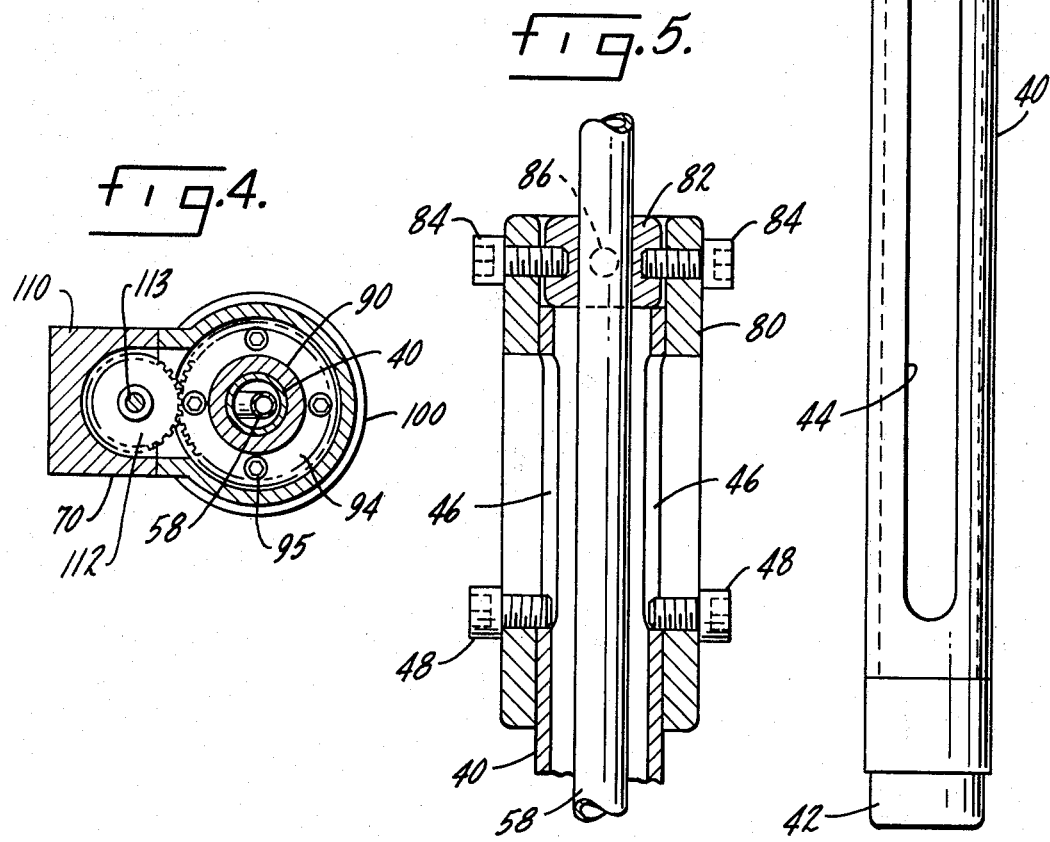

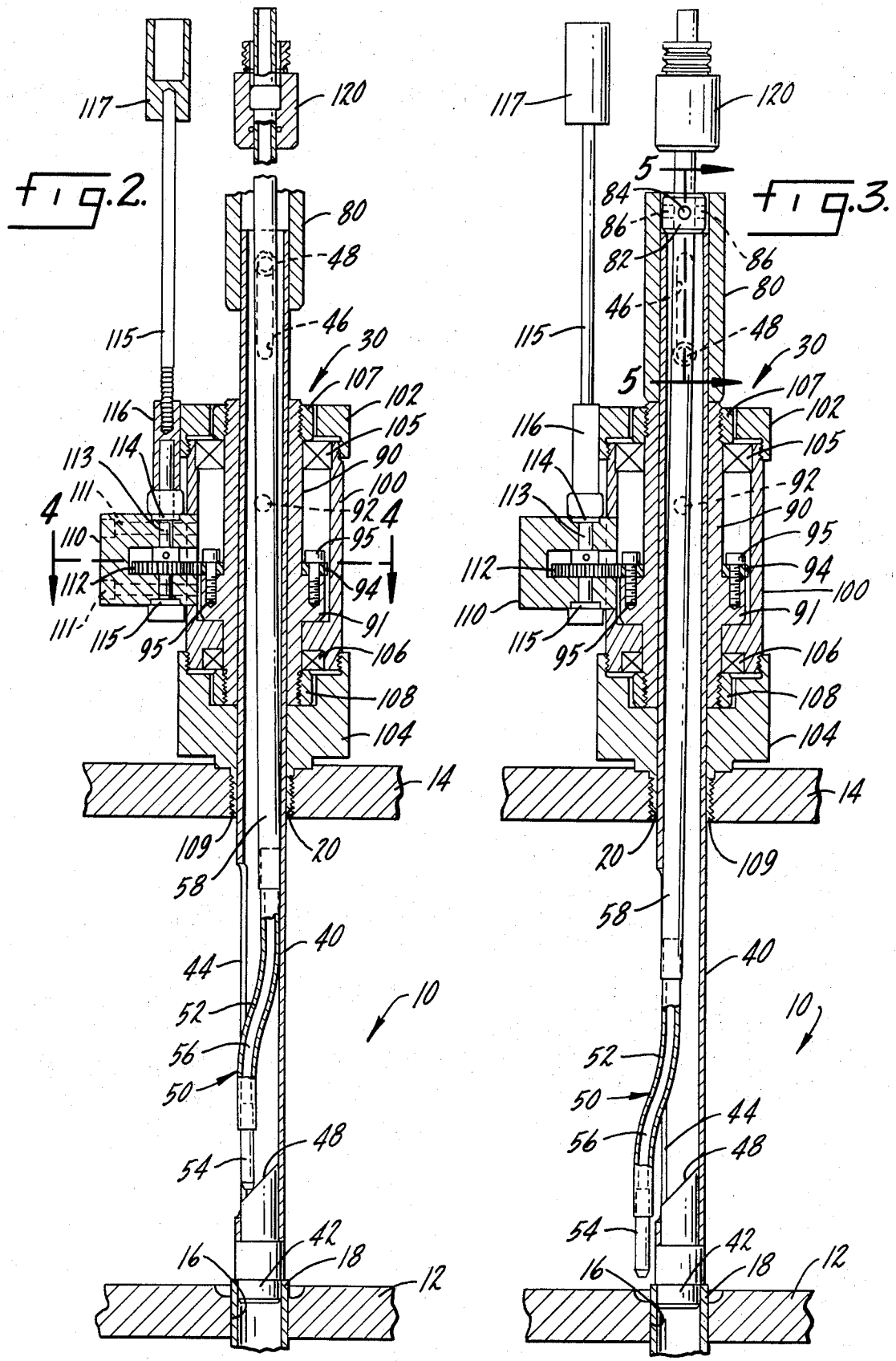

WELDING GUN

BACKGROUND OF THE INVENTION

This invention relates to improvements in welding apparatus and more particularly to welding apparatus for welding heat exchange tubes to tube sheets or headers for use in heat exchange equipment.

Most air cooled finned-tube type heat exchangers are fabricated with rectangular headers to which finned heat exchange tubes are attached at their respective ends. The headers have inner tube sheets to which the tubes are secured and an outer plug sheet opposite the tube sheet. The plug sheet has a plurality of holes equal in number and opposite the ends of the tube to permit access to the tube ends for cleaning purposes, replacement and initial fabrication. These holes are threaded so that a plug and gasket can be inserted as a seal during operation. These holes are of a slightly larger diameter than the diameter of the tube sheet holes so that various tools can be inserted for cleaning and for roller expanding. However, these holes cannot be enlarged excessively without materially weakening the plug sheet and thereby requiring additional plug sheet thickness or a reduction of the allowable internal pressure of the header.

It is frequently necessary to weld the heat exchange tube ends to the tube sheets to provide a better seal and more strength at the joint than can be achieved by merely expanding the tube ends into the tube sheet holes until sufficient metal to metal contacts exist at the joints. Previous welding guns have been heretofore used to provide an arc between the welding gun and the material, melting the end of the tube against the tube sheet hole, thus providing a fused weld joint. Difficulty occurs with this type of design as a limited weld throat exists, since no metal is added, and the chemistry and metallurgy of the weld joint cannot be controlled. It is therefore desirable to feed welding wire to this point, thereby adding additional metal as well as controlling the metallurgy and chemistry of the weld joint. To do this, a difficult problem has to be overcome. The tube sheet is anywhere from 6 to 12 inches away from the plug sheet, making the tube sheet somewhat inaccessible and requiring a welding apparatus able to reach through the plug hole inside of the header to gain access to the tube to tube sheet joint. The limited plug hole diameter sets the width dimension of the welding apparatus.

In accordance with the teachings of the prior art, attempts have been made to produce this type of seal by conventional processes. These prior art approaches have proved cumbersome because of the inaccessibility of the header into which the tubes must be sealed. Essentially the prior art practice requires that the heat exchanger be disassembled so that the header be freely accessible to the operator. Such an operation is time consuming and costly. Welding apparatus specifically designed to weld heat exchange tubes to headers are disclosed in U.S. Pat. No. 3,275,795 to A. Bosna et al and U.S. Pat. No. 3,428,777 to G. M. Certain. Both of these welding devices require the enlargement of the plug sheet openings to permit access of the welding apparatus into the header. As alluded to above, enlargement of the plug sheet holes causes plug sheet weakness and requires either additional thickness or a reduction of allowable internal header pressure.

SUMMARY OF THE INVENTION

It is a primary object of the present invention to provide welding apparatus for producing a welded joint in a relatively inaccessible region.

It is another object to provide welding apparatus for welding heat exchange tubes to the header tube sheets without disassembling the header or enlarging the holes in the header plug sheet.

It is a further object of the present invention to provide welding apparatus of the type mentioned immediately above which will permit quicker and more accurate welding operations than those heretofore obtainable in the art.

In accordance with this invention in its specific aspects, apparatus is provided which includes a welding electrode which is selectively retracted and extracted from within a positioning hollow tubular member. The positioning tube with the welding electrode in its retracted position may be inserted into the header through one of the holes in the plug sheet. The positioning tube includes a bushing which is threadedly received in the plug sheet hole and a fitting which is received by the heat exchange tube being welded in place so as to locate and center the positioning tube in the end of the tube to be welded. The welding electrode may then be extracted through a groove in the positioning tube and located adjacent the periphery of the tube end. At this point, the welding electrode is supplied with a welding material and a supply of inert gas through the center of the welding electrode. The arc fired eldctrode and positioning tube are then caused to rotate through a gear mechanism to describe the required circular weld. The welding electrode is then retracted into the positioning tube and the bushing is unscrewed from the plug sheet hole to permit the extraction of the unit from the header to make ready for the next weld in another tube.

BRIEF DESCRIPTION OF THE DRAWINGS

Other objects and features of the invention will become apparent to those skilled in the art as in the disclosure is made in the following description of a preferred embodiment of the invention, as illustrated in the accompanying sheets of drawings, in which:

FIG. 1 is an elevation, with certain parts in section, showing the welding apparatus of the present invention employed in conjunction with a welding operation on a portion of a finned-tube type of heat exchanger;

FIG. 2 is a sectional view through the welding apparatus of the present invention with the welding electrode in its retracted position;

FIG. 3 is a sectional view through the welding apparatus as in FIG. 2 with the welding electrode in its extracted position;

FIG. 4 is a sectional view taken along line 4—4 in FIG. 2;

FIG. 5 is a sectional view taken along line 5—5 in FIG. 3; and

FIG. 6 is an enlarged elevation of the inner portion of the positioning tube showing the groove formed therein for retraction and extraction of the welding electrode therethrough.

DESCRIPTION OF A PREFERRED EMBODIMENT

Referring to FIG. 1, a heat exchanger header is illustrated generally at 10 as including a heavy plate metal tube sheet 12 and plug sheet 14. Tube sheet 12 has openings 16 formed therein for receipt of the inlet ends of heat exchange tubes 18. Plug sheet 14 has openings 20 formed therein of equal number to the number of openings 16 and in opposite facing alignment therewith. Openings 20 are of slightly larger diameter than openings 16 and are threaded to receive sealing plugs 22. Tube sheet 12 is spaced approximately 6 to 12 inches from plug sheet 14, making tube sheet 12 somewhat inaccessible through openings 20. An inlet manifold 24 is provided to direct steam to be condensed through inlet opening 26 into header 10 for distribution into heat exchange tubes 18. The welding apparatus of the present invention as indicated generally at 30 is designed to weld the inlet ends of tubes 18 to the periphery of openings 16 by gaining access to the weld joint through openings 20.

Welding apparatus 30 generally includes a hollow positioning tube 40, a retractable welding electrode 50, a wire feed control means 60 and a gear train means 70. As seen in FIG. 1 the positioning tube 40 and electrode 50 extend through an opening 20 in plug sheet 14 for positioning adjacent the inlet end of the tube 18 to be welded. In order to permit passage of tube 40 and electrode 50 through opening 20 it is necessary to retract electrode 50 into tube 40. By so doing, it is not necessary to enlarge opening 20. The wire feeding means 60 and the gear train means 70 remain outside of header 10.

Referring to FIGS. 2 and 3, the structural assembly of welding apparatus 30 is illustrated in space relationship to a header 10 having a tube sheet 12 and a plug sheet 14 with the welding electrode 50 respectively in its retracted and extracted positions. Positioning tube 40 is an elongated tubular member having an outer diameter slightly less than the diameter of opening 20 so as to permit its passage therethrough. The inner end of tube 40 includes a positioning fitting 42 secured thereto having an outer diameter slightly less than the inner diameter of heat exchange tube 18 to permit its entry thereinto. Adjacent the inner end of tube 40 an elongated groove 44 is cut therefrom to permit the extraction and retraction of welding electrode 50 therethrough, as seen in FIGS. 2, 3 and 6. Adjacent the upper end of tube 40 a pair of elongated grooves 46 are cut therefrom for receipt of set screws 48, as seen in FIG. 5, which limit the longitudinal movement of welding electrode 50 within tube 40 in a manner which will hereinafter become more apparent.

Positioned within tube 40 and extending longitudinally therethrough is welding electrode 50 which includes a welding electrode member 52 and an electrode guide 58. Electrode member 52 includes a welding tip 54, of conventional construction, supported at the inner end of a bent or crook shaped electrode support 56 which in turn is secured at its outer end to electrode guide 58. A camming surface 48 is provided within tube 40 immediately above fitting 42 to guide electrode member 52 from its retracted position within tube 40, as seen in FIG. 2, through groove 44 to its extracted position, as seen in FIG. 3, by application of an inwardly directed force through the electrode guide 58. Secured adjacent the outer end of electrode guide 58 is a collar member 80. Collar 80 is secured to a bushing 82 by a pair of set screws 84 which in turn is secured to guide 58 by a pair of set screws 86, as best seen in FIG. 5. Collar member 80 is slidably positioned about the outer end of tube 40 and receives set screws 48 therethrough; the ends of which extend into grooves 46 so as to limit the longitudinal movement of collar 80 and electrode guide 58 secured thereto relative to tube 40.

A hollow shaft 90 is secured to tube 40 by a pair of set screws 92 to effect the rotation therewith. Secured to shaft 90 by set screw 95 at step portion 91 is a gear member 94. A housing 100, having insulating end caps 102 and 104, encloses shaft 90. Bearings 105 and 106 and nylon insulating bushings 107 and 108 are provided between shaft 90 and housing 100 to permit rotation of shaft 90 therein around an axis through the center line of positioning tube 40. End cap 104 includes a threaded stub portion 109 which is threadedly received by plug sheet opening 20 and is thereby effective to predetermine the length of tube 40 to be extended into header 10.

Secured to housing 100 by set screws 111 is a gear box housing 110 which contains a gear member 112 secured to a shaft 113 mounted to rotate within bearings 114 and 115. Gear 112 is positioned in meshing relationship to rotate gear 94 and shaft 90 secured thereto. One end of shaft 113 is secured to a first end of a flexible drive shaft 115 at coupling 116 and a motor means (not shown) is secured to a second end of shaft 115 at coupling 117. The rotation of shaft 115 is effective to rotate shaft 113 and gear 112 secured thereto which in turn rotates gear 94 and shaft 90 secured thereto.

Secured to the outer end of electrode guide 58 is a control box structure 120 which is preferably designed to include means for feeding a continuous flexible rod of welding material and supplying an outflow of inert gas through the inside of guide 58 to welding tip 54. Such means are well known in the art and do not specifically form an important part of the present invention and therefore will not be herein discussed in detail.

In operation, welding electrode 50 is retracted into position within tube 40, as seen in FIG. 2. Positioning tube 40 is then inserted through opening 20 in plug sheet 14 to a depth such that fitting 42 is received by tube 18 and stub portion 109 is threadedly received by plug sheet opening 20. With tube 40 centered in place, the electrode 50 is then moved to its extracted position, as seen in FIG. 3. This is accomplished by applying an inward force to collar 80 to slide it toward header 10. Since electrode guide 50 is secured to collar 80 via bushing 82 the welding electrode member 52 is likewise moved in an inward direction. This inward movement of electrode member 52 causes welding tip 54 to contact camming surface 48 and move out groove 44 to its position adjacent the joint between tube 18 and the corresponding opening 20, as seen in FIG. 3. Set screws 86 permit an accurate positioning of welding tip 54 relative to the weld joint.

At this point, welding material and inert gas is supplied through the inside of electrode guide 58 to welding tip 54 by control box 120. Once the arc is fired, the electrode 50 is rotated until the desired weld is completed. The rotation of electrode 50 is accomplished by activating a motor which rotates shafts 115 and 113 to drive gear 112. Gear 112 drives gear 94 which rotates shaft 90 and tube 40 about an axis which passes through the center of tube 18 so as to cause welding tip 54 to describe the required circular weld joint. When the weld joint is completed the welding electrode 50 is retracted into position within tube 40 by moving collar 80 in an outward direction. Pins 48 riding within grooves 46 define the inward and outward movement limits of collar 80. With welding electrode 80 in its retracted position, as in FIG. 2, the stub portion 109 is unscrewed from opening 20 and welding apparatus 30 is removed from header 10 through opening 20 and made ready for the next weld.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A method for applying a weld to an inaccessible surface of a first member by means of an elongated welding gun extending through a relatively small opening formed in a second member spaced from said first member; comprising the steps of:
   a. passing a hollow tubular member, having a welding electrode retracted into position therein, through the opening in the second member;
   b. positioning the inner end of the hollow tubular member adjacent said surface of the first member;
   c. extracting the welding electrode from the hollow tubular member in both a longitudinal and radial direction;
   d. applying the weld material to said surface of the first member by the welding electrode;
   e. retracting the welding electrode into the hollow tubular member; and
   f. removing the hollow tubular member, with the welding electrode positioned therein, through the opening in the second member.

2. A method for welding a heat exchange tube to a header section having a tube sheet with openings formed therein for receipt of the ends of said heat exchange tubes and a plug sheet positioned in facing relationship to said tube sheet and spaced therefrom having openings formed therein in opposing relationship with each of said tube sheet openings; comprising the steps of:
   a. passing a tubular member, having a welding electrode retracted in position therein, through one of the plug sheet openings;
   b. positioning the inner end of the tubular member adjacent the opposing opening in the tube sheet and the heat exchange tube associated therewith;
   c. extracting the welding electrode from the tubular member in both a longitudinal and radial direction;
   d. rotating the welding electrode about the end of the heat exchange tube while feeding welding wire to the electrode so as to form the required weld;
   e. retracting the welding electrode into the tubular member; and
   f. removing the tubular member with the welding electrode positioned therein, through the opening in the plug sheet.

3. The method as defined in claim 2 wherein said plug sheet openings are threaded and said tubular member includes a bushing associated therewith which is threadedly received by the plug sheet opening so as to position the inner end of said tubular member a predetermined distance into said header.

4. The method a defined in claim 3 wherein the inner end of the tubular member includes a fitting associated therewith for insertion into the end of the heat exchange tube so as to locate and center the positioning of the tubular member relative to the surface to be welded.

5. The method as defined in claim 3 wherein the inner portion of said tubular member has an elongated groove cut therefrom to permit the extraction and retraction of said welding electrode therethrough.

6. Welding apparatus for welding heat exchange tubes to a header section which includes a tube sheet having openings formed therein for receipt of the ends of said heat exchange tubes and a plug sheet positioned in facing relationship to said tube sheet and spaced therefrom having openings formed therein in opposing relationship with each of said tube sheet openings; said welding apparatus comprising:
   a. a tubular member having an outside diameter slightly less than the diameter of said openings in said plug sheet;
   b. welding electrode means retractably positioned within said tubular member having a retracted position within said tubular member and an extracted position wherein at least the welding tip thereof is positioned outside the periphery of said tubular member;
   c. first mean for selectively feeding welding material to said welding electrode means; and
   d. second means for rotating said welding electrode means about an axis passing through said tubular member;
   e. said tubular member being sized to permit passage thereof through said opening in said plug sheet, with said welding electrode means in said retracted position, to a position adjacent the corresponding hole in said tube sheet such that said welding electrode means may be extracted therefrom in both a longitudinal and radial direction and receive welding material from said first means and be rotated by said second means and thereby weld the end periphery of said heat exchange tube to said tube sheet.

7. The apparatus as defined in claim 6 wherein said plug sheet openings are threaded and said tubular member includes a bushing associated therewith which is threadedly received by the plug sheet opening so as to position the inner end of said tubular member a predetermined distance into said header.

8. The apparatus as defined in claim 7 wherein the inner end of said tubular member includes a fitting associated therewith for insertion into the end of the corresponding heat exchange tube so as to locate and center the positioning of said tubular member relative to the area to be welded.

9. The apparatus as defined in claim 6 wherein said welding electrode means includes a welding electrode member secured to an electrode guide member which is longitudinally moveable within said tubular member.

10. The apparatus defined in claim 9 wherein said welding electrode member has a crook portion which cooperates with an elongated groove cut from the inner end of said tubular member so as to permit the extraction and retraction of said welding electrode member therethrough.

11. The apparatus as defined in claim 6 wherein said second means includes gear train means selectively driven by power means for rotating said tubular member with said welding electrode means associated therewtih about the peripheral edge of said heat exchange tube.

12. The apparatus as defined in claim 9 wherein said first means feeds said welding material through said electrode guide member to said welding electrode member.

13. Welding apparatus for welding heat exchange tubes to a header section which includes a tube sheet having openings formed therein for receipt of the ends of said heat exchange tubes and a plug sheet positioned in facing relationship to said tube sheet and spaced therefrom having openings formed therein in opposing relationship with each of said tube sheet openings; said welding apparatus comprising:
   a. an elongated tubular member having an outside diameter less than the diameter of said openings in said plug sheet, said tubular member having an elongated groove cut from the inner end thereof;
   b. welding electrode means retractably positioned within said tubular member having a retracted position within said tubular member and an extracted position wherein at least the welding tip thereof is positioned outside the periphery of said tubular member, said welding electrode means includes a welding electrode member having a crook portion which cooperates with said elongated groove so as to permit the extraction and retraction of said welding electrode therethrough in both a longitudinal and radial direction and a hollow electrode guide member which is longitudinally moveable within said tubular member;
   c. first means for selectively feeding welding material through said electrode guide member to said welding electrode member; and
   d. second means for rotating said welding electrode means including gear train means selectively driven by power means for rotating said tubular member and said welding electrode associated therewith about the peripherial edge of said heat exchange tube;
   e. said tubular member permitting passage thereof through said opening in said plug sheet with said welding electrode means in said retracted position to a position adjacent the corresponding opening in said tube sheet such that said welding electrode means may be extracted therefrom and receive welding material from said first means and be rotated by said second means and thereby weld the end periphery of said heat exchange tube to said tube sheet.

14. The apparatus as defined in claim 13 wherein said plug sheet openings are threaded and said tubular member includes a bushing associated therewith which is threadedly received by said plug sheet opening so as to position the inner end of said tubular member a predetermined distance into said header.

15. The apparatus as defined in claim 14 wherein the inner end of said tubular member includes a fitting associated therewith for insertion into the end of the corresponding heat exchange tube so as to locate and center the positioning of said hollow tube relative to the area to be welded.

16. The invention as defined in claim 14 including collar means received about said tubular member in sliding relationship thereto, said collar means being secured to said electrode guide means to effect longitudinal movement thereof within said tubular member.

17. The invention as defined in claim 16 wherein said tubular member has a groove cut therefrom to receive a pin means secured to said collar means to limit movement of said collar means relative to said tubular member.

* * * * *

PO-1050
(5/69)

UNITED STATES PATENT OFFICE
CERTIFICATE OF CORRECTION

Patent No. 3,777,110          Dated December 4, 1973

Inventor(s) Melvin G. Yohn and Joseph P. Simon

It is certified that error appears in the above-identified patent and that said Letters Patent are hereby corrected as shown below:

In column 2, line 31, the word "eldctrode" should be --electrode--.

In column 2, line 42, the word "in" should be deleted.

In column 4, line 46, after the word "it" insert --inward--.

In column 5, line 65, the word "a" should be --as--.

In column 7, line 1, the word "rewtih" should be --rewith--.

Signed and sealed this 4th day of June 1974.

(SEAL)
Attest:

EDWARD M. FLETCHER, JR.
Attesting Officer

C. MARSHALL DANN
Commissioner of Patents